US009852226B2

(12) United States Patent
Salvetti et al.

(10) Patent No.: US 9,852,226 B2
(45) Date of Patent: Dec. 26, 2017

(54) SEARCH ENGINE RESULTS SYSTEM USING ENTITY DENSITY

(71) Applicant: Microsoft Corporation, Redmond, WA (US)

(72) Inventors: Franco Salvetti, San Francisco, CA (US); Srinivas Vadrevu, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 14/822,852

(22) Filed: Aug. 10, 2015

(65) Prior Publication Data
US 2017/0046435 A1 Feb. 16, 2017

(51) Int. Cl.
*G06F 17/30* (2006.01)
(52) U.S. Cl.
CPC .. *G06F 17/30867* (2013.01); *G06F 17/30371* (2013.01); *G06F 17/30424* (2013.01); *G06F 17/30554* (2013.01)
(58) Field of Classification Search
CPC ......... G06F 17/30867; G06F 17/30424; G06F 17/30371; G06F 17/30554
See application file for complete search history.

(56) References Cited

U.S. PATENT DOCUMENTS

| 7,516,119 | B1* | 4/2009 | Kao | ..................... G11C 15/00 |
| 8,515,888 | B2 | 8/2013 | Ventilla et al. | |
| 8,655,866 | B1 | 2/2014 | Provine et al. | |
| 8,788,514 | B1 | 7/2014 | Ramanarayanan et al. | |
| 8,819,007 | B2 | 8/2014 | Brown et al. | |
| 2010/0235343 | A1 | 9/2010 | Cao et al. | |
| 2011/0191364 | A1 | 8/2011 | LeBeau et al. | |
| 2011/0231395 | A1 | 9/2011 | Vadlamani et al. | |
| 2013/0132327 | A1 | 5/2013 | Pande et al. | |
| 2014/0081973 | A1* | 3/2014 | Jha | ..................... G06F 17/30861 707/737 |
| 2014/0207832 | A1* | 7/2014 | Robert | ................ G06F 3/04817 707/822 |
| 2014/0258286 | A1 | 9/2014 | Brown et al. | |
| 2014/0278363 | A1 | 9/2014 | Allen et al. | |

(Continued)

OTHER PUBLICATIONS

"International Search Report and Written Opinion Issued in PCT Application No. PCT/US2016/044137", dated Nov. 8, 2016, 11 Pages.

(Continued)

*Primary Examiner* — Etienne Leroux
(74) *Attorney, Agent, or Firm* — Jeffrey L. Ranck; Ranck IP Law

(57) ABSTRACT

Architecture that enables search engines to meet user expectations for search results (e.g., questions-answers) by improving on result consistency. This is attained by declining to answer queries when it is known by the system that the system is unable to answer more or equivalently prominent queries in the same query class in a vast majority of cases. To achieve consistency, queries are categorized into classes and then the queries of a specific class are segmented into clusters. The answer density in each cluster is then computed to determine the consistency of that class of queries. Clusters with a relatively low answer density are then suppressed to improve consistency for the user.

20 Claims, 7 Drawing Sheets

(56) References Cited

U.S. PATENT DOCUMENTS

2016/0004756 A1* 1/2016 Rosenthal ......... G06F 17/30696
 707/706
2016/0048568 A1* 2/2016 Silverberg .......... G06F 17/3087
 707/734

OTHER PUBLICATIONS

Lita, et al., "Instance-Based Question Answering: A Data Driven Approach", In Proceedings of Conference on Empirical Methods in Natural Language Processing, Jul. 25, 2004, 9 pages.

Brill, et al., "An Analysis of the AskMSR Question-Answering System", In Proceedings of ACL Conference on Empirical Methods in Natural Language Processing, vol. 10, Jul. 6, 2002, 8 pages.

Chaturvedi, et al., "Joint Question Clustering and Relevance Prediction for Open Domain Non-Factoid Question Answering", In Proceedings of International World Wide Web Conference Committee, Apr. 7, 2014, pp. 503-513.

Fader, et al., "Paraphrase-Driven Learning for Open Question Answering", In Proceedings of 51st Annual Meeting of the Association for Computational Linguistics, vol. 1, Aug. 4, 2013, 11 pages.

Nie, et al., "Frequency-Based Coverage Statistics Mining for Data Integration", In Proceedings of IJCAI Workshop on Information Integration on the Web, Aug. 9, 2003, 6 pages.

Wen, et al., "Clustering User Queries of a Search Engine", In Proceedings of 10th International Conference on World Wide Web, May 1, 2001, pp. 162-168.

Raj, Dhwaj, "Instant Question Answering System", Published on: Feb. 20, 2014 Available at: http://wise.99acres.com/uncategorized/instant-question-answering-system/.

European Patent Office, Officer Axel Schmidt, PCT Written Opinion for Application No. PCT/US2016/044137, dated Jul. 3, 2017, 6 pages, Berlin, Germany.

Notification of Transmittal of the International Preliminary Report on Patentability dated Oct. 19, 2017 for patent application No. PCT/US2016/044137. 8 pages.

* cited by examiner

SEARCH ENGINE RESULTS SYSTEM USING ENTITY DENSITY

BACKGROUND

In response to a user query, an existing web search engine can return direct answers, in addition to sets of documents, for example, by displaying the string "29,028 feet" in response to the query "Mount Everest height". Interaction with a question-answering system generates user expectations about the ability of the system to answer classes of queries. For example, if a search engine returns an answer for "Mount Bachelor height", the system creates an expectation in the user by which the system is then also expected to know (have data about) the heights of all mountains of similar saliency (or relevancy). Failing to return a direct answer for one or more questions about other mountain heights then negatively impacts the user expectation of reliability in the system, thereby generating user dissatisfaction and eventually creating abandonment by the user.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables search engines to meet user expectations for search results (e.g., questions-answers) by managing result consistency. This is enabled by declining to return some or all results to a query when it is computed that the architecture is unable to provide suitable results of more or equivalently prominent queries in the same query class. Consistency is defined in terms of relative prominence or saliency of different queries in the same query class. For example, prominence of a query can be measured by using, as proxy, query frequency in a query log collected by a search engine.

In order to compute consistency, queries are categorized into classes and then the queries of a specific class are grouped into clusters. The result (e.g., answer) density in each cluster is then computed to determine the consistency of the given class of queries. Clusters with a relatively low answer density are then suppressed to improve consistency. Based on the prominence information, the result consistency of a query class can be computed and a threshold algorithm adjusted to improve predictability, which relates to consistency.

The architecture can be implemented as a system, comprising: a query processing component configured to deconstruct queries of a class into chunks of entities and to cluster the chunks into clusters; a density component configured to compute result densities for the corresponding clusters and compare the result densities of the clusters to density thresholds to determine result consistency of the clusters; and, a results component configured to return results for a query based on favorable comparison of the result densities to the corresponding density thresholds and suppress results for the query based on unfavorable comparison of the result densities to the corresponding density thresholds, to maintain the result consistency. A threshold component can be provided and configured to determine and adjust the density thresholds of the clusters to maintain the result consistency.

The architecture can be implemented as a method, comprising acts of: computing result densities of clusters of entity chunks, the chunks derived from a class of queries; comparing the result densities of the clusters to density thresholds to determine a result consistency of the clusters; returning results for a query based on favorable comparison of the result densities to the corresponding density thresholds; and, suppressing results for the query based on unfavorable comparison of the result densities to the corresponding density thresholds, to maintain the result consistency.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
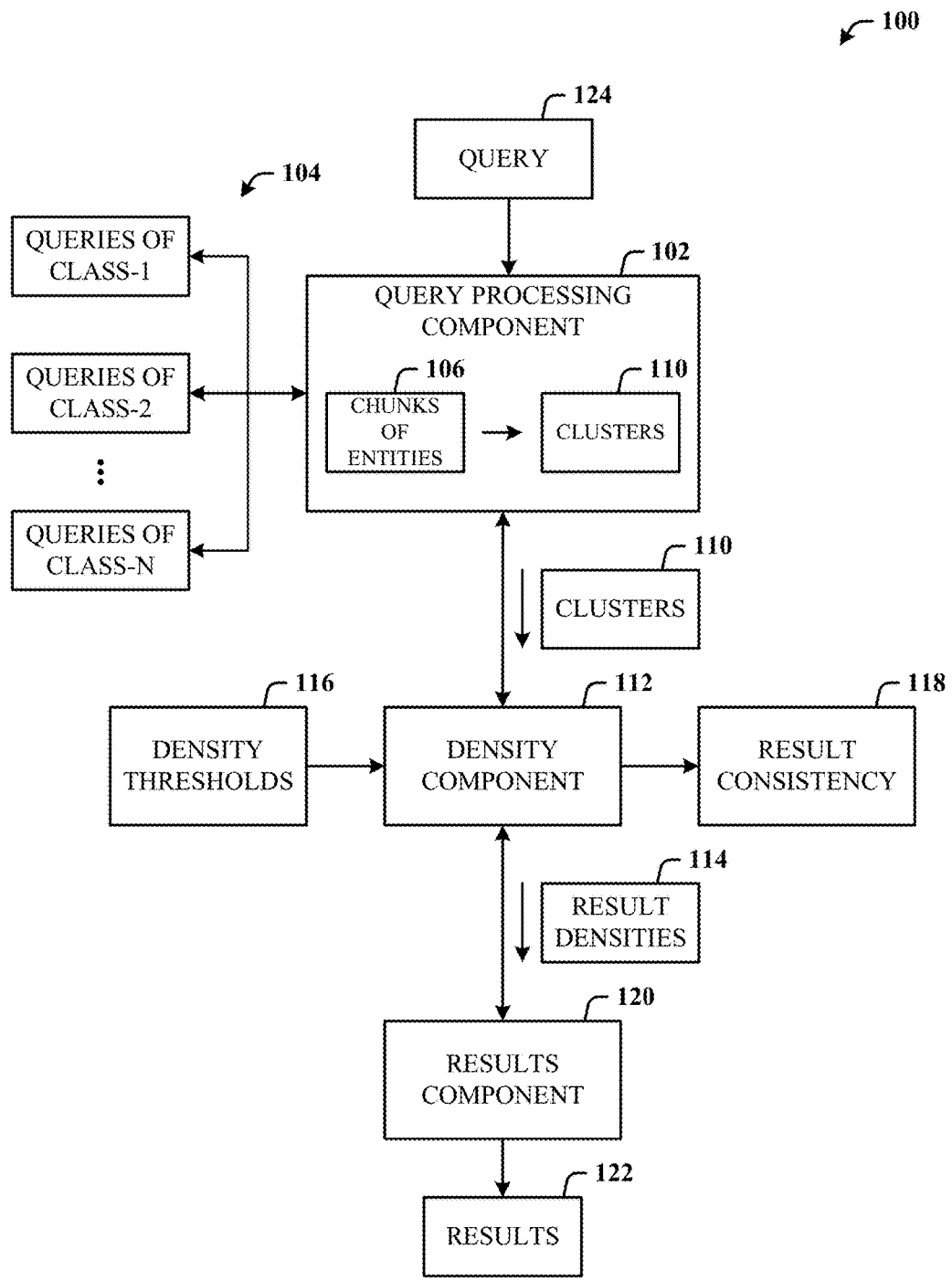
FIG. 1 illustrates a system in accordance with the disclosed architecture.

In order for users to purposefully attempt to use a search engine system, the users want some level of confidence that the desired results will be returned and presented; otherwise, users will need to rely on accidental discovery—an inefficient and undesirable prospect. Search engines that do not implement this confidence level capability are deemed brittle and fail in establishing a reliable "contract" with the user to return the desired results.

It is known in literature that users prefer to see high result density for prominent queries, followed by a quick drop-off once some threshold of obscurity is reached. For example, if the query class is "capitals of <political regions>", the user expects to see capitals of all nations of the world and all states of the United States (assuming an American audience); however, if the system has no county seat results, the user would be able to accept that limitation.

The disclosed architecture enables search engines to meet user expectations for results (e.g., questions-answers) by improving result consistency. This is attained by declining to send results to queries when it is known by the architecture that the architecture is unable to provide results to equivalently or more prominent queries in the same query class in a vast majority of cases.

The term "consistency" is used to denote whether the architecture can predictably provide results (e.g., an answer)

to a query as the user might reasonably expect, given that the architecture returns results to another less or equally prominent query for an entity in the same query class. Consistency is defined in terms of relative prominence or saliency of different queries in the same query class. For example, prominence of a query can be measured by using, as proxy, query frequency in a query log collected by a search engine.

To achieve consistency, queries are categorized into classes and then the queries of a specific class are grouped into clusters. The result (e.g., answer) density in each cluster is then computed to determine the consistency of the given class of queries. Clusters with a relatively low result (answer) density are then suppressed to improve consistency as might be expected by the user.

Based on the prominence information, the result consistency of a query class can be computed and a threshold algorithm adjusted to improve predictability (i.e., consistency). As an example, a class of queries requesting "heights of mountains" is first expanded into instances by leveraging a lexicographic expansion (synonyms) method, which is then used to identify and extract actual instances from query logs. A user might be interested in the measure of the "height of mt everest", which can be expressed in many different ways, each way an instance of the class "height of mount everest" which also belongs to the more general class of queries asking about "height of mountains". Within such a class there are mountains of different saliency. To collect counts from query logs about saliency, expansion is performed on all possible ways in which something can be expressed.

These queries, along with relative query frequencies, can then be organized by frequencies and grouped into clusters (also referred to as quantiles) whose boundaries are functions of the expected number of requests of information within such a cluster.

For each cluster, the density is computed by dividing the number of queries that are answered by the system by the total number of queries. Results in each cluster are considered suitable for display to users if the associated result density is greater than some density threshold. In this case, the threshold can be expressed as some percentage of the density of more salient clusters.

The density threshold can be determined on an absolute basis (e.g., only clusters with a density greater than $\alpha$ is displayed). Alternatively, the density threshold can be determined on a cross-section basis (e.g., only clusters having a density greater than $\beta$ of the cluster with the next-largest frequencies, are displayed). The parameters ($\alpha, \beta$) can be empirically set based on the rate of abandonment or re-queries within the same query class, for example.

The disclosed architecture ensures that entities whose saliency is similar to a returned result (or answer) are visualized in a large percentage of cases. In turn, this establishes a reliable contract with the user.

As disclosed herein, density thresholds can be different for different corresponding classes, a density threshold can be generated for a class of clusters, and so on. The term chunks is utilized herein, where chunking is the act of taking a sequence and subdividing the sequence into subsequences, and possibly, to then label each sequence with a class name. A cluster (or quantile) refers to an interval of entity frequency within which the density(s) of results (or answers) are measured.

In natural language processing, a sequence of characters of a query are referred to tokens. Depending on the tokenizing technique employed, a different amount of tokens can be generated. For example, the string "You can find it at bing.com ;-)" can be interpreted to contain seven tokens, where a URL (uniform resource locator) can be treated as a token, and emoticons, as one token. A different tokenizer can process this query "you//can//find//it//at//bing//.//com//;//)" and count ten tokens. Thus, tokens boundaries are determined by the particular tokenizer.

Given a sequence of tokens, the beginning and end of a name can be marked. Named entity recognition (NER) taggers (also referred to as entity chunking) can be built which implicitly define, in associated NER guidelines, what a name is, and the taggers might or might not accept the embedding of names, in the following example: "how high is <name>mount rainier</name>".

With respect to two extra possible normalization steps, it is possible to create a set of all possible surface forms (fundamental units of a lexicon of a language) meaning which share the same meaning and create the "/height" attribute (note the slash symbol "/" at the beginning indicates that is not a word, but the meta-word (a word describing another word such as in a programming language that uses a word that means something other than its literal meaning) referring to the class of all expressions requesting "height"). A similar process can be performed for names; then map the names into an ontology and create a class name for it (e.g., /Mount_Rainer). Even without an ontology/taxonomy the different surface forms are clustered (e.g., Everest, Mt. Everest, Mount Everest, etc.) and then mapped into the same entity name to look-up the attribute value. The same process can be performed for the surface form of the "/height" (e.g., how tall, what's the height, height of, etc.).

In general, of interest is that for given calls (e.g., celebrities), knowing the density of a certain attribute (e.g., height) pertinent for that class (where here, the density is the ratio of celebrities for which can be returned their height within the class of celebrity which have the same perceived saliency (e.g., if the height of Madonna is known, the user can expect the architecture to know the "/height" of Paris Hilton. In even different words, it is desired to ensure that when a direct answer for a query is returned, for example, of the form {<entity><attribute>}, the architecture can also return a direct answer for all entities in the same class with similar perceived relevancy.

The disclosed architecture embodies the method for enforcing this constraint and using not query logs and behavioral data, but also inbound links or other information to determine which entities of the same class have similar saliency in the mind of a generic user.

As used herein, the term entity is intended to mean something that has a distinct, separate existence, such as a person, a movie, a restaurant, an event, a book, a song, an album, or a place of interest. Each entity has a name and a set of other attributes that describe it.

The disclosed architecture exhibits technical effects related to hardware and software resources, as well as for user efficiency and interactions. For example, the disclosed capability of suppressing the processing and return of search results enables improved memory utilization (conservation) by decreased memory usage for unfavorable results conservation, reduced processor load by the suppression and return of search results, reduced network bandwidth usage, again, by the suppression and return of search results. The suppression of undesirable search results also enables improved user efficiency when searching for information by enabling the user to move on to more effective searches rather than perusing results that are not relevant to the intended query.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a query processing component 102 configured to deconstruct queries 104 of classes (e.g., a class CLASS-2) into chunks of entities 106 and to cluster the chunks 106 into clusters 110.

A density component 112 is provided and configured to compute result densities 114 for the corresponding clusters 110 and compare the result densities 114 of the clusters 110 to density thresholds 116 to determine result consistency 118 of the clusters 110.

A results component 120 is provided and configured to return results 122 (e.g., via a search engine results page) for a query 124 based on favorable comparison of the result densities 114 to the corresponding density thresholds 116, and suppress results for the query 124 based on unfavorable comparison (by the density component 112) of the result densities 114 to the corresponding density thresholds 116, to maintain the result consistency 118.

The query processing component 102 can also be configured to identify and extract the chunks of the entities 106 from query logs. The density thresholds 116 can be empirically defined based on a rate of abandonment or re-queries within a same query cluster (of the clusters 110). The query 124 can be a question and the results can be answers to the question, and the system is a question-answer system. The results component 120 maintains the result consistency 118 by declining to answer more or equivalently prominent queries in a same query class (e.g., Queries of Class-2).

Figure 2:
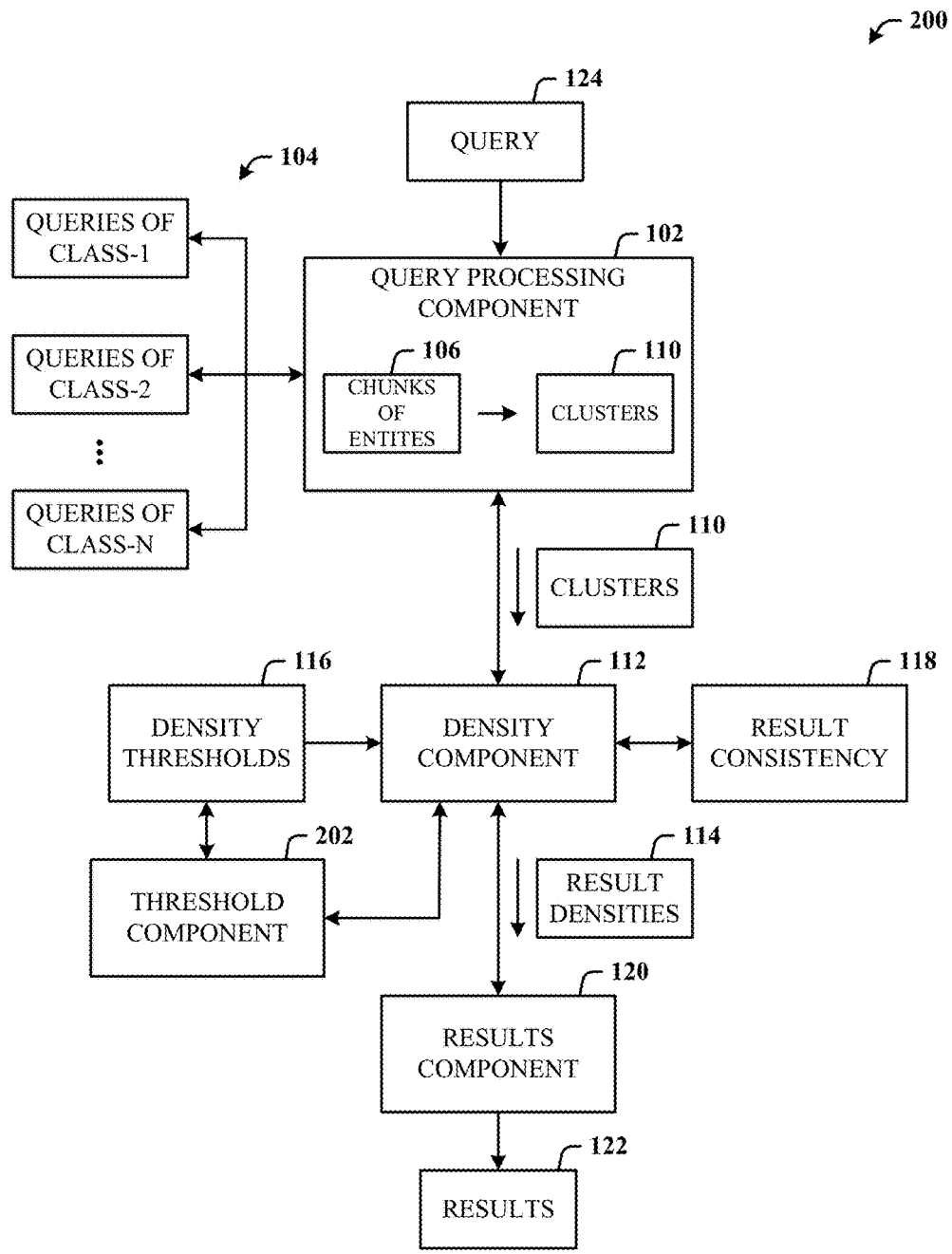
FIG. 2 illustrates an alternative system in accordance with the disclosed architecture.

FIG. 2 illustrates an alternative system 200 in accordance with the disclosed architecture. System 200 further comprises a threshold component 202, in addition to the system 100 of FIG. 1. The threshold component 202 can be provided and configured to determine and adjust the density thresholds 116 of the clusters 110 to maintain the result consistency 118. The threshold component 202 can also be configured to determine the density thresholds 116 on an absolute basis. The threshold component 202 can also be configured to determine the density thresholds 116 on a cross-sectional basis. The threshold component 202 can also be configured to determine the density thresholds 116 expressed as a percentage of a density of clusters having a greater saliency than the density(s) of one or more other clusters (of the clusters 110).

It is to be understood that in the disclosed architecture, certain components may be rearranged, combined, omitted, and additional components may be included. For example, the density component 112 and the results component 120 can be combined as a single component, the query processing component 102 can be combined with the density component 112, the query processing component 102 can be combined with the density component 112 and the results component 120, and/or with the threshold component 202, and so on.

Figure 3:
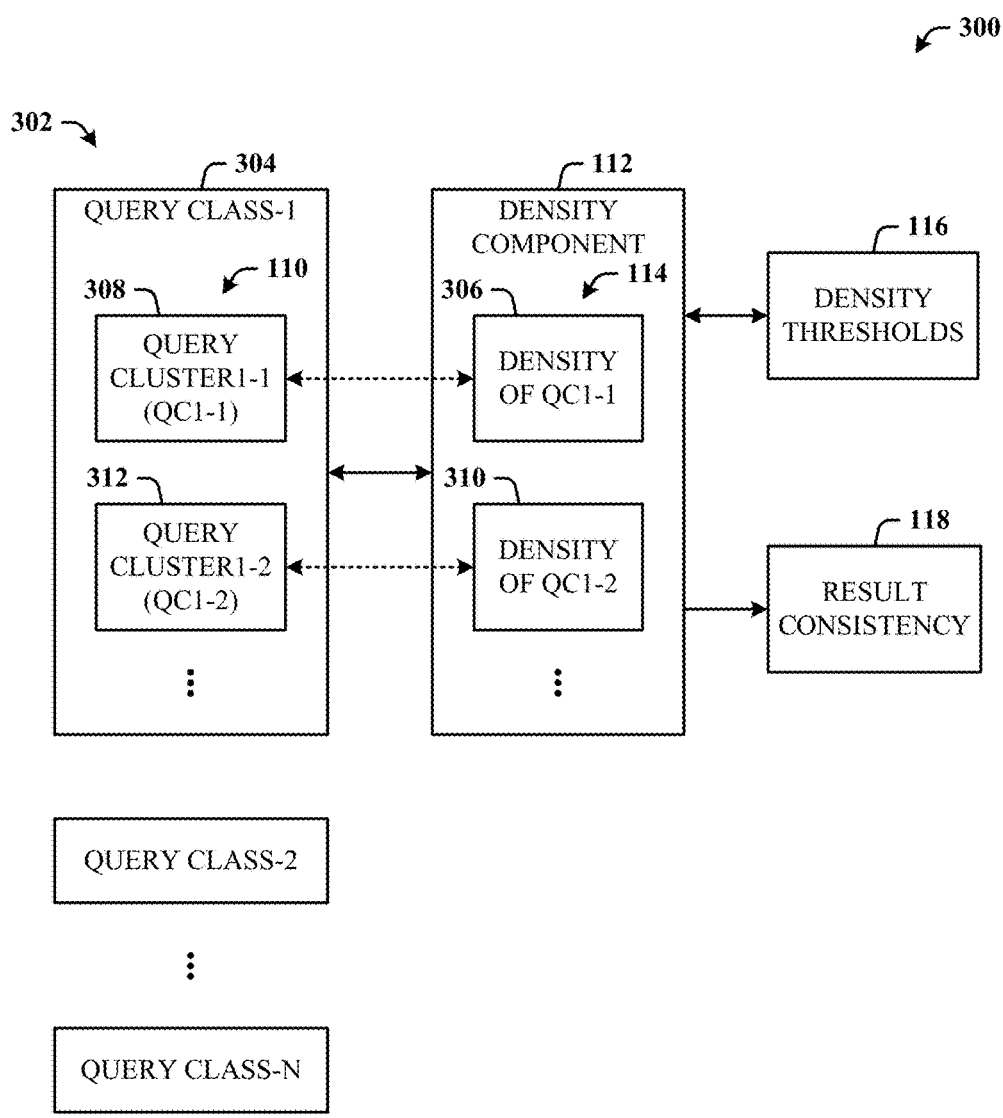
FIG. 3 illustrates a system of result density computation in accordance with the disclosed architecture.

FIG. 3 illustrates a system 300 of result density computation in accordance with the disclosed architecture. As previously indicated, the density component 112 is provided and configured to compute result densities 114 for the corresponding clusters 110 of query classes 302 (e.g., a first query class 304). For example, the density component 112 computes a first results density 306 for the first query cluster 308, a second results density 310 for a second query cluster 312, and so on, for all clusters 110 of the given query classes 302. In this way, ultimately, suppression of unfavorable results can be performed on a per-cluster basis to maintain or exceed result consistency 118.

The results consistency 118 can be computed for each query class of the query classes 302. The results consistency 118 can be quantified value and adjusted up or down based on criteria such as a specific user, a class of users, and so on.

The density component 112 also compares the result densities 114 of the clusters to density thresholds 116 to determine the result consistency 118 of the clusters. The density thresholds 116 can comprise individual density thresholds for corresponding cluster densities (e.g., a first density threshold for the first result density 306, a second density threshold for the second result density 310, and so on. It can also be the case that alternative to, or in addition to, a density threshold is computed for and applied to more than one result density (e.g., a single density threshold for both the first result density 306 and the second result density 301) or all result densities of a given query class (e.g., a single density threshold for all result densities 114 of the first query class 304).

Figure 4:
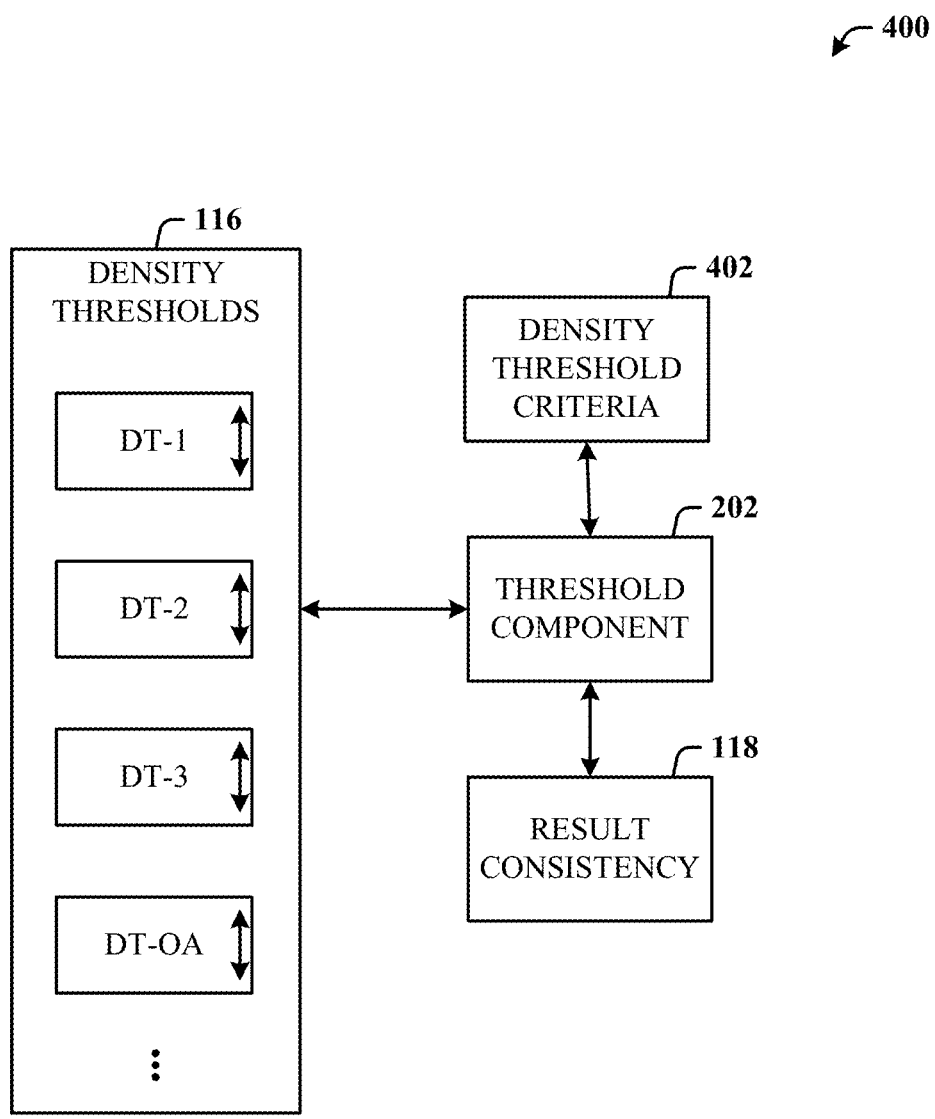
FIG. 4 illustrates a system of density threshold computation and adjustment in accordance with the disclosed architecture.

FIG. 4 illustrates a system 400 of density threshold computation and adjustment in accordance with the disclosed architecture. As previously indicated, the threshold component 202 computes and adjusts (if desired) the density thresholds 116 of the clusters 110 to maintain or change the result consistency 118. This computation and/or adjustment can be based on density threshold criteria 402 that remains static or that changes. For example, an initial threshold setting can be applied that remains static for some span of time, but thereafter is adjusted up or down (indicated by the doubled-headed vertical arrow) to account for changes in information or data received or accumulated over time for a user, set of users, or all users.

As an example, if a query is relatively unknown to the system (users rarely submit such a query), the result consistency 118 may be relaxed (set lower)—rather than providing no results, at least provide some results to the user in an attempt to establish a "contract" between the user(s) and the system. However, based on user(s) interaction, if the user(s) indicate through behavioral actions that they were unsatisfied with the result, the threshold component 202 can adjust the threshold for that query class to sufficiently prevent any further attempts by the system at providing results the users now clearly indicated they do not want. Thus, this is a "start higher—adjust lower" rule for result consistency 118.

Carrying this example further, should user feedback indicate user dissatisfaction with this particular query contract, the system (threshold component 202) can then adjust the threshold upward to improve the result consistency 118 by suppressing and further results for this class.

It is to be appreciated that a system increase or decrease in the result consistency 118 for a given query class has the effect of a corresponding increase or decrease in the adjustment of the density threshold for that class. Where the result consistency 118 is derived based on multiple density thresholds, the algorithm of the threshold component 202 can be sufficiently robust to choose which one or several of the density thresholds to adjust to meet the desired result consistency 118.

In yet another example, the result consistency 118 can be modulated automatically for given circumstances. In one such example, a "start higher—adjust lower" rule can be applied for the result consistency 118. If a query is heavily used and known to the system, and routinely results in suppressed output results due to previously-indicated inadequate result density, the result consistency 118 may be relaxed (set lower) to at least provide some information to the user in an attempt to create some level of a "contract" between the user(s) and the system. However, based on user(s) interaction, if the user(s) indicate through behavioral actions that they were unsatisfied with the result, the threshold component 202 can adjust the threshold for that query class to sufficiently prevent any further attempts by the system at providing results the users now clearly indicated they do not want.

In yet another example, if at given result consistency setting, user feedback indicates the result consistency 118 is allowing negative user feedback for a given query, the result consistency can be increased to then cause the density threshold(s) to increase as well, thereby resulting in a greater number of suppressed results. Thus, user satisfaction should improve at least insofar is not being required to then peruse results that fail to meet the user's expectation.

The threshold component 202 can also be configured to determine the density thresholds 116 on an absolute basis. The threshold component 202 can also be configured to determine the density thresholds 116 on a cross-sectional basis. The threshold component 202 can also be configured to determine the density thresholds 116 expressed as a percentage of a density of clusters having a greater saliency than the density(s) of one or more other clusters (of the clusters 110).

The disclosed architecture can optionally include a privacy component (not shown) that enables the user to opt in or opt out of exposing personal information. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
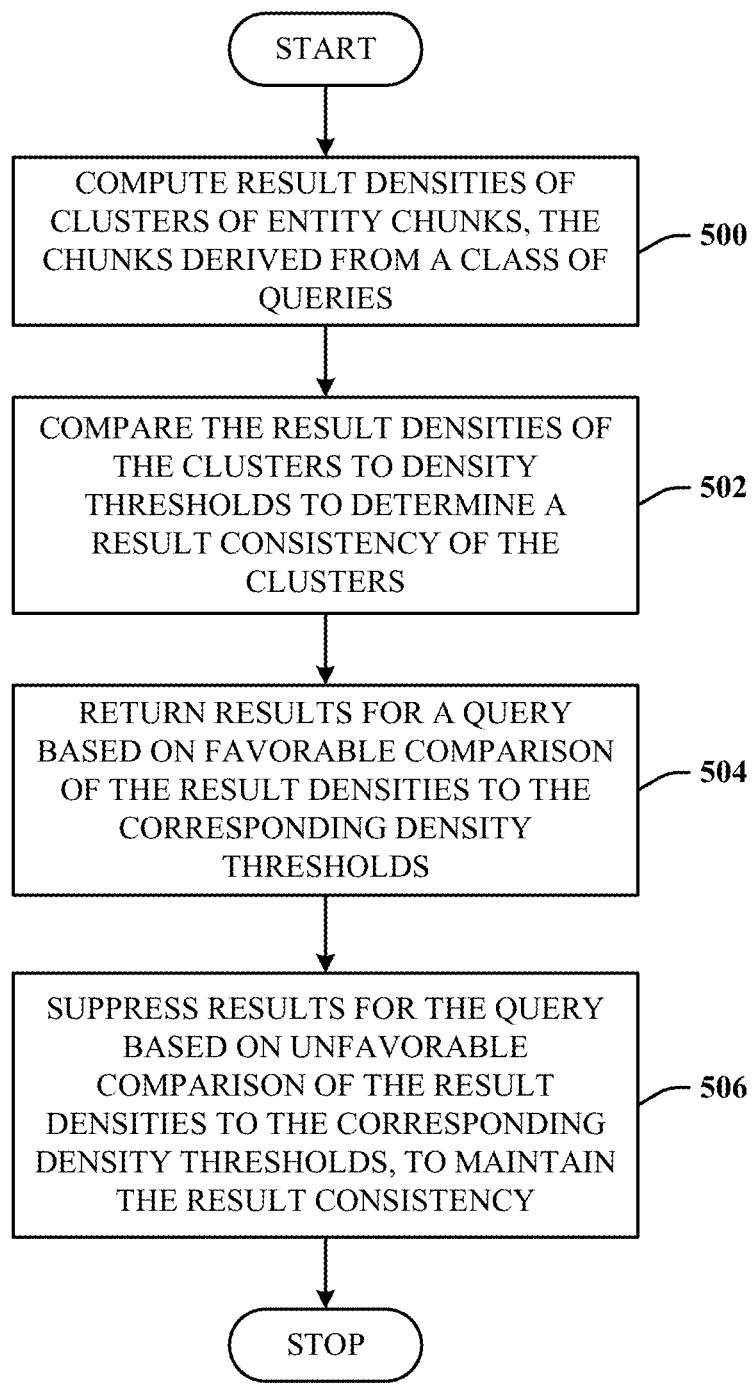
FIG. 5 illustrates a method in accordance with the disclosed architecture.

FIG. 5 illustrates a method in accordance with the disclosed architecture. At 500, result densities of clusters of entity chunks are computed. The chunks can be derived from a class of queries. At 502, the result densities of the clusters are compared to density thresholds to determine a result consistency of the clusters. At 504, results for a query are returned based on favorable comparison of the result densities to the corresponding density thresholds. At 506, results for the query are suppressed based on unfavorable comparison of the result densities to the corresponding density thresholds, to maintain the result consistency.

The method can further comprise suppressing a cluster with unacceptable result densities. The method can further comprise computing the result consistency of a class and adjusting the result consistency to improve predictability.

The method can further comprise expanding the class of queries into chunks of the entities using a lexicographic expansion method. The method can further comprise identifying and extracting actual chunks of the entities from query logs. The method can further comprise defining suitable answers of a cluster according to at least one of an absolute basis or a cross-sectional basis.

Figure 6:
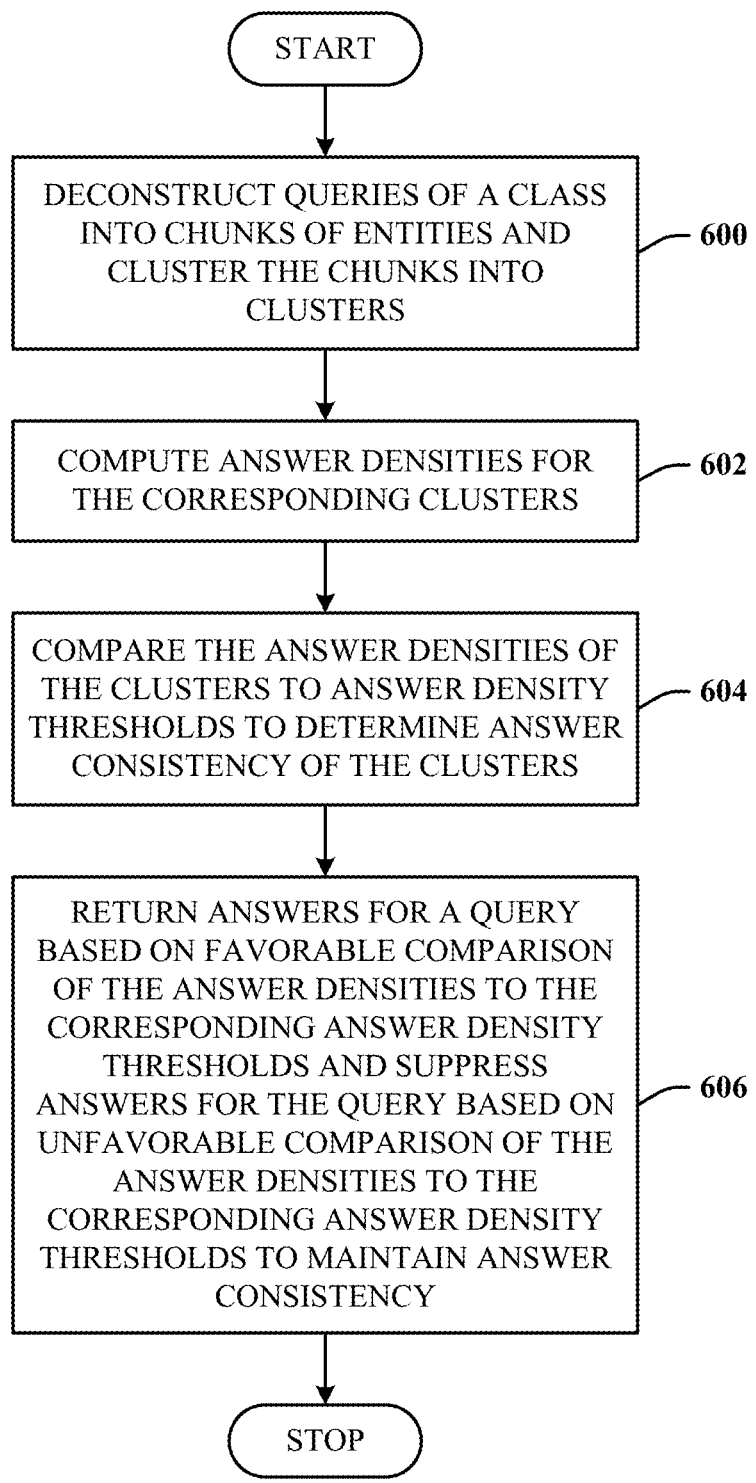
FIG. 6 illustrates an alternative method in accordance with the disclosed architecture.

FIG. 6 illustrates an alternative method in accordance with the disclosed architecture. At 600, queries of a class are deconstructed into chunks of entities and clustering the chunks into clusters. At 602, answer densities are computed for the corresponding clusters. At 604, the answer densities of the clusters are compared to answer density thresholds to determine answer consistency of the clusters. At 606, answers for a query are returned based on favorable comparison of the answer densities to the corresponding answer density thresholds, and answers for the query are suppressed based on unfavorable comparison of the answer densities to the corresponding answer density thresholds to maintain answer consistency.

The method can further comprise adjusting a density threshold to maintain answer consistency of an associated cluster. The method can further comprise defining suitable answers of a cluster according to at least one of an absolute basis or a cross-sectional basis. The method can further comprise identifying and extracting the chunks of the entities from query logs. The method can further comprise clustering the queries according to relative frequencies as relate to identification of the queries in query logs, and separating the clusters based on an expected number of requests of information from the clusters.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
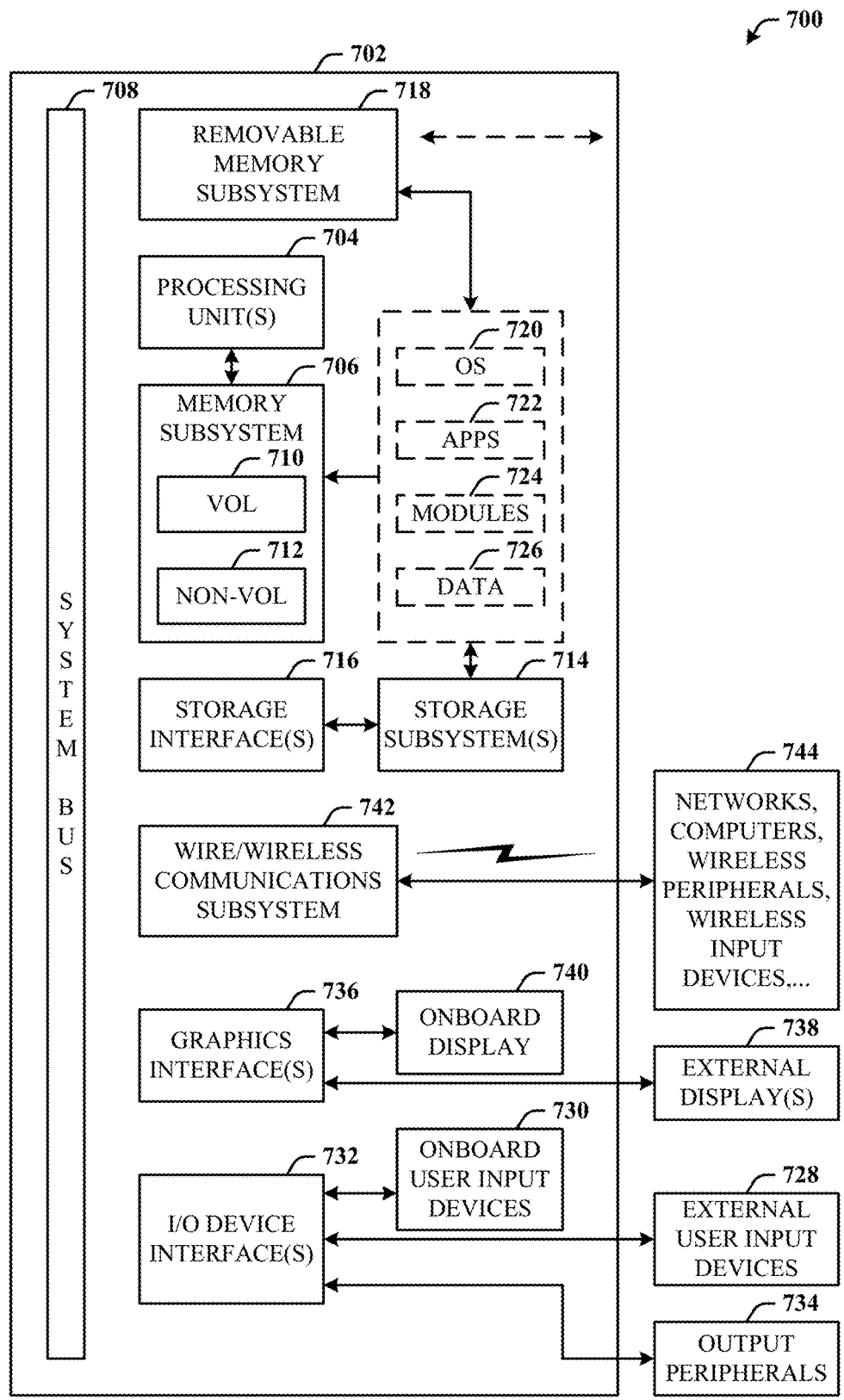
FIG. 7 illustrates a block diagram of a computing system that executes search engine results using entity density in accordance with the disclosed architecture.

Referring now to FIG. 7, there is illustrated a block diagram of a computing system 700 that executes search engine results using entity density in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium (where the medium is any physical device or material on which data can be electronically and/or optically stored and retrieved) such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the system 200 of FIG. 2, items and components of the system 300 of FIG. 3, items and components of the system 400 of FIG. 4, and the methods represented by the flowcharts of FIGS. 5 and 6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as a system, comprising: means for computing result densities of clusters of entity chunks, the chunks derived from a class of queries; means for comparing the result densities of the clusters to density thresholds to determine a result consistency of the clusters; means for returning results for a query based on favorable comparison of the result densities to the corresponding density thresholds; and, means for suppressing results for the query based on unfavorable comparison of the result densities to the corresponding density thresholds, to maintain the result consistency.

The disclosed architecture can be implemented as an alternative system, comprising: means for deconstructing queries of a class into chunks of entities and clustering the chunks into clusters; means for computing answer densities for the corresponding clusters; means for comparing the answer densities of the clusters to answer density thresholds to determine answer consistency of the clusters; and, means for returning answers for a query based on favorable comparison of the answer densities to the corresponding answer density thresholds and suppressing answers for the query based on unfavorable comparison of the answer densities to the corresponding answer density thresholds to maintain answer consistency.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
a query processing component configured to deconstruct queries of a class into chunks of entities and to cluster the chunks into clusters;

a density component configured to compute result densities for the corresponding clusters and compare the result densities of the clusters to density thresholds to determine result consistency of the clusters;

a results component configured to return results for a query based on favorable comparison of the result densities to the corresponding density thresholds and suppress results for the query based on unfavorable comparison of the result densities to the corresponding density thresholds, to maintain the result consistency; and at least one hardware processor configured to execute computer-executable instructions in a memory, the instructions executed to enable the query processing component, the density component, and the results component.

2. The system of claim 1, wherein the query processing component is configured to identify and extract the chunks of the entities from query logs.

3. The system of claim 1, wherein the density thresholds are empirically defined based on a rate of abandonment or re-queries within a same query cluster.

4. The system of claim 1, wherein the query is a question and the results are answers, and the system is a question-answer system.

5. The system of claim 1, wherein the results component maintains result consistency by declining to answer more or equivalently prominent queries in a same query class.

6. The system of claim 1, further comprising a threshold component configured to determine and adjust the density thresholds of the clusters to maintain the result consistency.

7. The system of claim 6, wherein the threshold component is configured to determine the density thresholds on an absolute basis.

8. The system of claim 6, wherein the threshold component is configured to determine the density thresholds on a cross-sectional basis.

9. The system of claim 6, wherein the threshold component is configured to determine the density thresholds expressed as a percentage of a density of clusters having a greater saliency.

10. A method, comprising acts of:
computing result densities of clusters of entity chunks, the chunks derived from a class of queries;
comparing the result densities of the clusters to density thresholds to determine a result consistency of the clusters;
returning results for a query based on favorable comparison of the result densities to the corresponding density thresholds; and
suppressing results for the query based on unfavorable comparison of the result densities to the corresponding density thresholds, to maintain the result consistency.

11. The method of claim 10, further comprising suppressing a cluster with unacceptable result densities.

12. The method of claim 10, further comprising computing the result consistency of a class and adjusting the result consistency to improve predictability.

13. The method of claim 10, further comprising expanding the class of queries into chunks of the entities using a lexicographic expansion method.

14. The method of claim 13, further comprising identifying and extracting actual chunks of the entities from query logs.

15. The method of claim 10, further comprising defining suitable answers of a cluster according to at least one of an absolute basis or a cross-sectional basis.

16. A method, comprising acts of:
deconstructing queries of a class into chunks of entities and clustering the chunks into clusters;
computing answer densities for the corresponding clusters;
comparing the answer densities of the clusters to answer density thresholds to determine answer consistency of the clusters; and
returning answers for a query based on favorable comparison of the answer densities to the corresponding answer density thresholds and suppressing answers for the query based on unfavorable comparison of the answer densities to the corresponding answer density thresholds to maintain answer consistency.

17. The method of claim 16, further comprising adjusting a density threshold to maintain answer consistency of an associated cluster.

18. The method of claim 16, further comprising defining suitable answers of a cluster according to at least one of an absolute basis or a cross-sectional basis.

19. The method of claim 16, further comprising identifying and extracting the chunks of the entities from query logs.

20. The method of claim 16, further comprising clustering the queries according to relative frequencies as relate to identification of the queries in query logs, and separating the clusters based on an expected number of requests of information from the clusters.

* * * * *